A. W. MILLER.
LAWN CUTTER AND CULTIVATOR.
APPLICATION FILED JAN. 2, 1920.
1,370,219.
Patented Mar. 1, 1921.
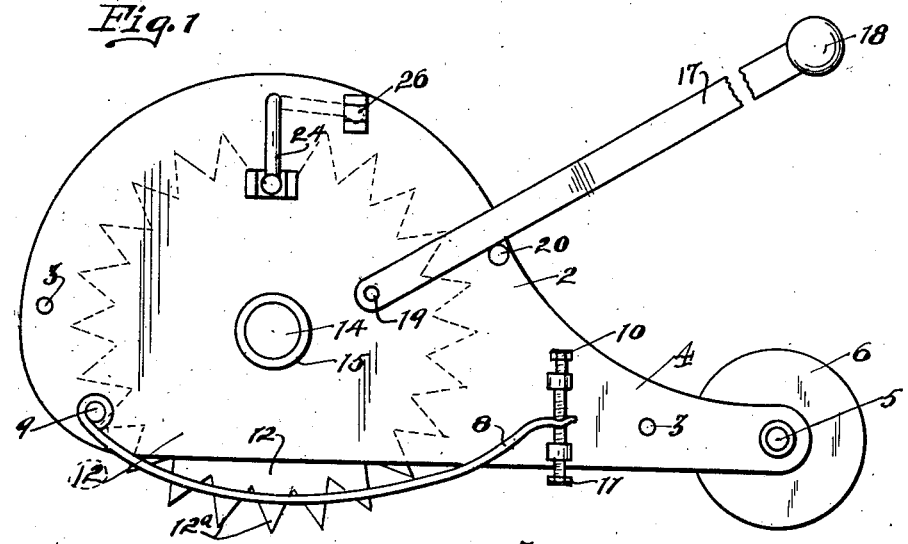
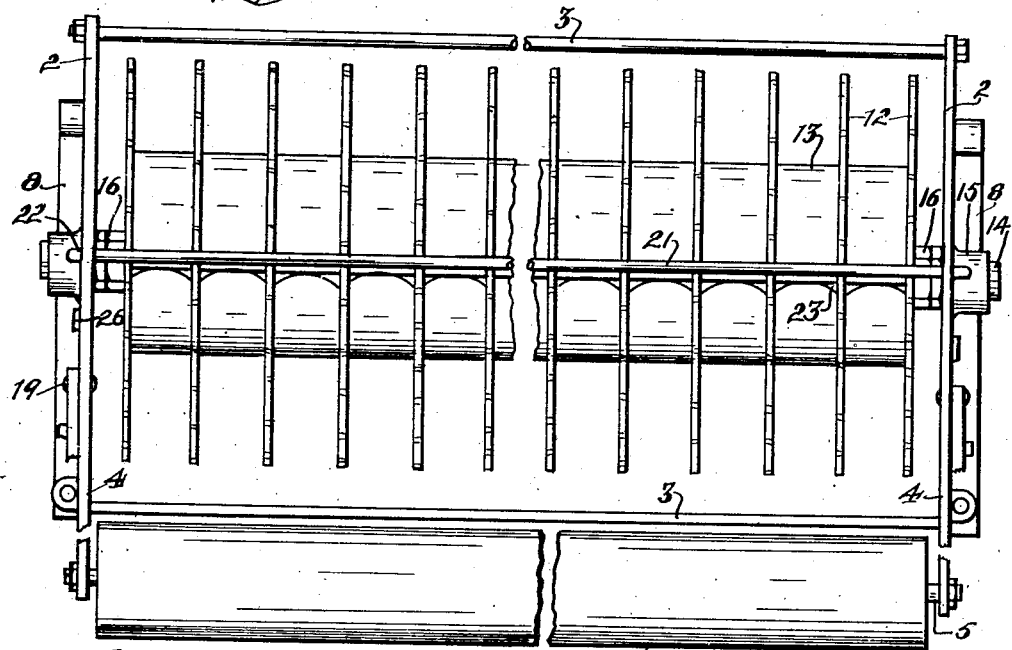
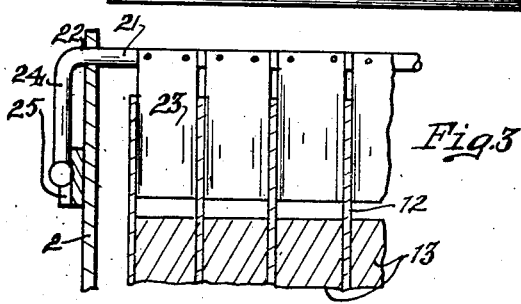
INVENTOR
Allen W. Miller
By Hazard & Miller
Att'ys

UNITED STATES PATENT OFFICE.

ALLEN W. MILLER, OF LOS ANGELES, CALIFORNIA.

LAWN CUTTER AND CULTIVATOR.

1,370,219. Specification of Letters Patent. Patented Mar. 1, 1921.

Application filed January 2, 1920. Serial No. 349,005.

*To all whom it may concern:*

Be it known that I, ALLEN W. MILLER, a citizen of the United States, residing at Los Angeles, in the county of Los Angeles and State of California, have invented new and useful Improvements in Lawn Cutters and Cultivators, of which the following is a specification.

This invention relates to apparatus for aerating top soil and especially for facilitating the growth of lawns, and has for its object to provide a device that is simple, substantial, inexpensive and that will operate rapidly to pierce the soil so that air can get to the roots of the lawn growth. In addition to perforating the soil to allow nitrogen of the air to pass into the soil to sweeten alluvial conditions an object is to eliminate weeds and grass by providing means for cutting the weeds and grass especially running and stooling grasses and other weeds; and the invention consists of the construction, an embodiment of which is illustrated in the accompanying drawings and described and claimed herein.

Figure 1 is a side elevation of the device as applied.

Fig. 2 is a plan view of the device broken away to indicate indefinite length or width and omitting the handle.

Fig. 3 is a detail sectional elevation of a fragment of the aerating device and the scrapers therefor.

The invention may be constructed in various embodiments and is shown as comprising a pair of side members 2—2 transversely connected by suitable brace rods 3—3, the side members being in the form of plates of suitable material and proportions having rearwardly extending arms 4—4 in which are mounted the ends of a shaft 5 on which may be provided rolling means as a small roller 6. The front portion of the frame structure may be elevated on suitable runners as skids or side shoes 8, one of which is attached to a respective stud 9 on each side member 2 and extending rearwardly from the stud or pivot forming part toward the rear arm 4 of each side, thence being mounted on an adjusting device comprising upper and lower set screws 10 and 11 respectively between the adjacent ends of which the terminal of the skid or runner 8 is clamped. To raise or lower the elevation of the front end of the frame structure, the set screws 10 and 11 are properly adjusted so as to change the position of the runners as may be desired.

For the purpose of aerating the soil in which grass or other lawn forming growth is growing, a penetrating device is mounted on the frame, this device comprising a series of laterally spaced members in the form of disks 12 of suitable diameter to sweep between the braces of the frame and shown as spaced from each other by spacing washers or sleeves 13 which with the disks 12 are removably mounted on a transverse and carrying shaft 14 having its ends mounted in a journal box 15 in the side frame members 2—2. The several disk or plate members 12 are provided with suitable penetrating prongs here shown as teeth $12^a$ of suitable contour that are designed to pierce the earth as the device is moved over the surface. The depth of such penetration will be varied by adjustment of the side runners or skid members 8—8.

Preferably, the gang penetrating device as 12 is so connected as to rotate as a unit and this may be accomplished by locking the disks 12 against the interposed spacing members 13 as by means of jam nuts 16 threaded on the ends of the shaft 14 and inside of the side plates 2 of the frame, so that the shaft 14 will rotate with the gang freely in the bearings 15.

The device may be propelled by any suitable means and is here shown as provided with an upwardly and rearwardly extending handle 17 the upper end of which is provided with purchase grips 18 and the lower end of the handle is bifurcated or spread to overlap the sides 2—2 and is pivoted upon alined pivot pins 19 in the sides.

When it is desired to shift the position of the device without perforating or piercing the soil, the operator may press the lever downwardly until it comes in contact with suitable stop means as pins 20 projecting from the sides 2 and below the adjacent portion of the handle, and thereafter further downward pressure on the lever grip members 18 will cause the device to tilt upwardly as on the roller member 6 as a fulcrum thus clearing the teeth $12^a$ of the penetrating devices from the soil.

A further feature of the invention resides in means for scouring or cleaning the disks 12, and as shown comprises a transversely extending rock shaft 21 pivoted as at 22 in the upper part of the side plates 2, the transversely extending portion of the shaft 21 having a series of depending scouring or cleaning blades 23 which, preferably, are flexible transversely so that when the rock shaft or rod 21 is tilted to the position shown in Figs. 1 and 3 by movement of its lever arms 24 then the blades 23 will be sprung frictionally into the spaces between adjacent disks 12 and bear on the faces of the same.

When it is desired to remove the blades 23 from contact with the disks it will be only necessary to swing the lever 24 from engagement with the lower seats 25, of which there is one for each end of the rock shaft, to the position shown in dotted lines in Fig. 1 so that the end of the lever 24 will spring into temporary interlock with an upper seat 26.

By forming the earth piercing members of star like wheels or sheets the oblique edges which form the points also form cutters to sever running and other grasses and weeds to materially reduce the growth of the same through the lawn.

Various changes may be made without departing from the spirit of my invention as claimed.

I claim:

1. In a device of the character described, a roller support frame with side runners adjustably connected so as to elevate the front of the frame, a shaft mounted transversely in the frame, and a series of spaced toothed piercing cutters mounted on the shaft and adapted when the device is propelled to closely pierce the soil to aerate the soil.

2. In a device of the character described, a roller support frame with side runners adjustably connected so as to elevate the front of the frame, a shaft mounted transversely in the frame, a series of cutting and piercing members mounted on the shaft and adapted when the device is propelled to closely pierce the soil to aerate the soil, and a scraper provided with a plurality of blades designed to bear upon adjacent faces of the piercing members and adapted to be shifted out of engagement with the same.

3. In a device of the character described, a carriage having a rolling means at its rear end, a gang of soil piercing members mounted on the frame and adapted to pierce the soil when the device is propelled, a lever or handle pivoted on the sides of the frame to be swung to a convenient operating position, and a stop device between the fulcrumed end of the handle and its outer end and in advance of the rolling means of the device, so that when the handle is pressed down it engages the stop and the device can be tilted on its rolling means so as to lift the penetrating members out of operative position.

4. In a device of the character disclosed, a frame, a piercing roller journaled in the forward end of the frame, runners pivoted at their forward end to the forward part of the respective sides of said frame, vertical screws engaging the upper and lower side of the rear end of each runner for adjusting said runners, a roller journaled in the rear of said frame, and a handle connected to said frame for pushing the device over the ground.

In testimony whereof I have signed my name to this specification.

ALLEN W. MILLER.